United States Patent
Shaw et al.

(10) Patent No.: US 7,387,019 B2
(45) Date of Patent: Jun. 17, 2008

(54) ADJUSTABLE TIRE SPREADER AND INSPECTION APPARATUS

(75) Inventors: Eugene L. Shaw, Lake Orion, MI (US); Terence H. James, Lake Orion, MI (US); Joseph G. Welmers, Rochester, MI (US)

(73) Assignee: Shearographics, LLC, Lake Orion, MI (US)

( * ) Notice: Subject to any disclaimer, the term of this patent is extended or adjusted under 35 U.S.C. 154(b) by 0 days.

(21) Appl. No.: 11/523,102

(22) Filed: Sep. 19, 2006

(65) Prior Publication Data

US 2008/0066532 A1 Mar. 20, 2008

(51) Int. Cl.
*G01M 17/02* (2006.01)

(52) U.S. Cl. .................................. 73/146; 254/50.2

(58) Field of Classification Search .............. 73/146; 356/237.2, 512; 254/50.3
See application file for complete search history.

(56) References Cited

U.S. PATENT DOCUMENTS

| | | | |
|---|---|---|---|
| 1,345,849 A | 7/1920 | Harkins | |
| 1,352,601 A | 9/1920 | Hawkinson | |
| 1,352,807 A | 9/1920 | Hawkinson | |
| 1,863,764 A | 6/1932 | Prentice | |
| 1,954,031 A | 4/1934 | Wood | |
| 2,028,440 A | 1/1936 | Dalrymple | |
| 2,035,972 A | 3/1936 | Mangel | |
| 2,179,896 A | 11/1939 | Neville | |
| 2,966,335 A | 12/1960 | Fike | |
| 3,043,565 A | 7/1962 | Sornsen | |
| 3,157,387 A | 11/1964 | Pinter et al. | |
| 3,568,978 A | 3/1971 | Larson | |
| 3,790,134 A | 2/1974 | Matteuzzi | |
| 3,969,627 A * | 7/1976 | Heisner et al. ................ 378/61 |
| 3,987,672 A * | 10/1976 | Loyer .......................... 73/146 |
| 4,160,537 A | 7/1979 | Severson | |
| 4,293,120 A | 10/1981 | Robins | |
| 6,268,923 B1 * | 7/2001 | Michniewicz et al. ....... 356/512 |
| 6,285,447 B1 * | 9/2001 | Parker et al. .............. 356/35.5 |
| 6,934,018 B2 | 8/2005 | Shaw et al. | |

* cited by examiner

*Primary Examiner*—Andre J Allen
(74) *Attorney, Agent, or Firm*—William J. Schramm

(57) ABSTRACT

Described are an adjustable tire spreader and inspection apparatus 10 and method comprising a pallet 14 for supporting a tire 12 to be viewed for inspection, the pallet 14 having an aperture 26 aligned with the hole of the tire; a plurality of a pair of paws 40, 42, the paws vertically aligned and adapted to separate the beads 60, 62 of the tire to allow an optical inspection apparatus to inspect the tire; each pair of paws positioned about the aperture of the pallet and capable of rotating from a closed position 42 A to an open position of the tire beads; each pair of paws spaced about the beads of the tire and simultaneously moves to separate the beads of the tire for inspection of the tire. In the method, one operates the apparatus 10 by placing the tire 12 on the pallet 14; aligning the paws with the bead of the tire; simultaneously moving the paws 40, 42 to separate the beads 60, 62 of the tire; and inspecting the tire.

Thereafter, the tire is removed from the pallet and tire spreader assembly.

11 Claims, 2 Drawing Sheets

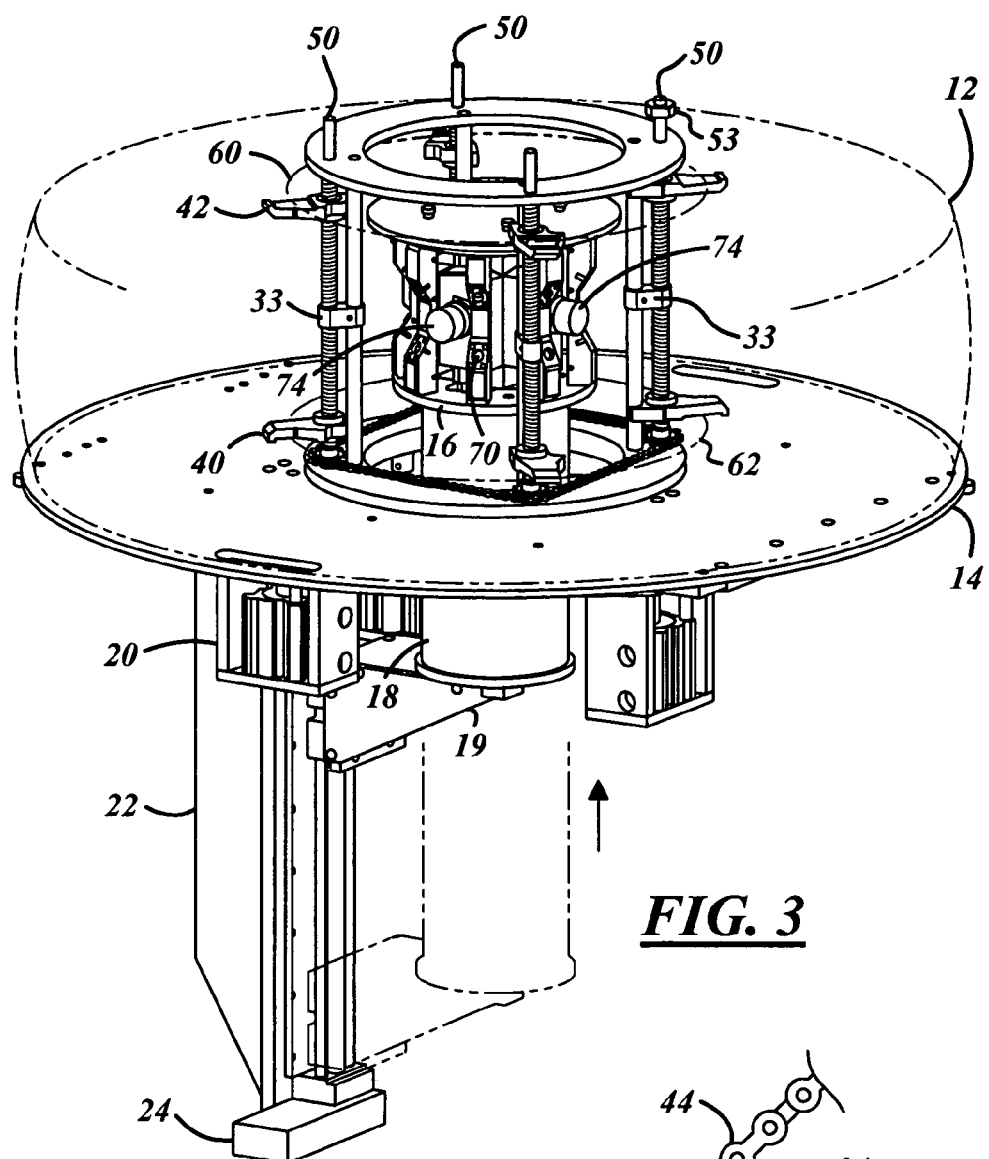
*FIG. 3*
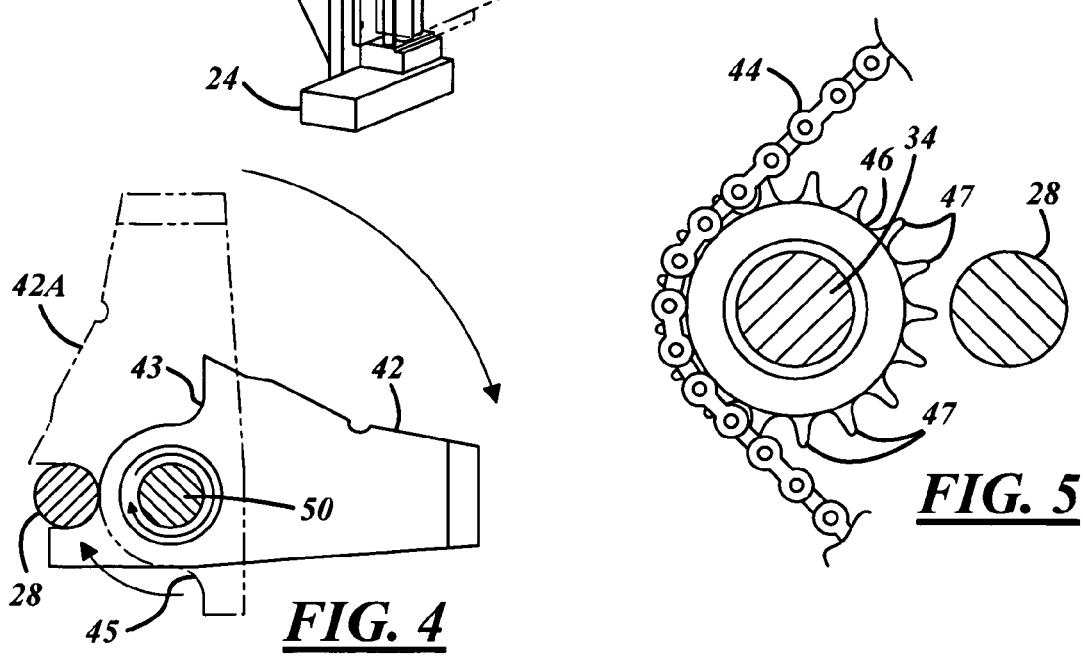
*FIG. 4*
*FIG. 5*

ADJUSTABLE TIRE SPREADER AND INSPECTION APPARATUS

FIELD OF THE INVENTION

The present invention pertains to the field of non-destructive testing (N D T). In particular, the invention pertains to such testing of tires utilizing an automated tire bead spreader.

BACKGROUND OF THE INVENTION

The inspection of tires has been a technique utilized for many years. An inspection apparatus for tires is described in U.S. Pat. No. 4,160,537. A pneumatic tire spreader is disclosed in U.S. Pat. No. 3,043,565. A manually operated tire spreader is disclosed in U.S. Pat. No. 1,954,031.

Other United States patents that may relate to this field are as follows:

| | | | | |
|---|---|---|---|---|
| 4293,120 | 3790,134 | 3568,978 | 3157,387 | 2966,335 |
| 2179,896 | 2035,972 | 2028,440 | 1863,764 | 1352,807 |
| 1352,601 | 1345,849 | | | |

In order to efficiently and quickly inspect tires, an apparatus is needed that would facilitate the separation of the beads of a tire to allow for a better view of the inside of the tire, especially the inner bead region commonly known in the trade as the turn up. There is also the necessity of quickly and efficiently inspecting a tire after the beads have been separated. Further, the tire spreader apparatus must be capable of separating the beads of tires of different sizes and to different widths. The tire spreader apparatus must therefore be amenable to such variations. A wide variety of inspection techniques is well known in the field. A particularly useful tire inspection apparatus is disclosed in U.S. Pat. No. 6,934,018, herein incorporated by reference.

This patent describes a technique for shining a laser onto a tire. A camera captures an image of the reflected laser light from the tire, and then the tire is subjected to a stress. Then the camera captures another image of the reflected laser light from the tire and then a computer calculate that digital information giving the results. Other techniques for tire inspecting apparatus are likewise disclosed in the '018 patent.

It is an object of the present invention to provide an adjustable tire spreader and inspection apparatus which can quickly and efficiently separate the beads of a tire of a variety of sizes of tires and likewise quickly and efficiently inspect the tire.

SUMMARY OF THE INVENTION

Described is an adjustable tire spreader and inspection apparatus comprising
- a pallet for supporting a tire to be viewed for inspection, the pallet having an aperture aligned with the hole of the tire;
- an optical inspection apparatus, adapted to inspect the tire at an inspection position when the tire is on the pallet; and
- a plurality of a pair of paws, the paws vertically aligned and adapted to separate the beads of the tire to allow the optical inspection apparatus to inspect the tire; each pair of paws positioned about the aperture of the pallet and capable of rotating from a closed to an open position of the tire beads; each pair of paws spaced about the beads of the tire and adapted to simultaneously move to separate the tire beads for inspection of the tire.

Also described is another embodiment of the invention, namely, a method of inspecting a tire comprising
- utilizing the apparatus described above;
- placing the tire on the pallet;
- aligning the paws with the bead of the tire;
- simultaneously moving the paws to separate the beads of the tire;
- aligning the inspection apparatus with the tire;
- and inspecting the tire.

BRIEF DESCRIPTION OF THE DRAWINGS

These and other objects, features and advantages of this invention will be apparent from the following detailed description, appended claims and accompanied drawings in which:

FIG. 3 is another view of FIG. 2 with the tire inspection apparatus in place.

FIG. 4 is a sectional view of FIG. 3 taken along the lines 4-4 of FIG. 3.

FIG. 5 is a sectional view taken along lines 5-5 of FIG. 1.

DETAILED DESCRIPTION OF THE INVENTION

Definitions

Anomaly is defined as a defect in a tire which can generally be characterized as air trapped in a cured tire as a result of variations in the thickness of the tire components; porosity and voids in the tire, a separation, an under cure of the tire, trapped air and bubbles; low interplay adhesion, poor cord adhesion, bare wires, broken cords, and machine building errors.

Coherent light is a light having a single wavelength, frequency and phase. It is also radiant electromagnetic energy of the same, or almost the same wavelength, and with definite phase relationships between different points in the field.

Laser is a device that produces a beam of coherent and monochromatic light as a result of photon-stimulated emission. Such beams have a single wavelength and frequency. Materials capable of producing this effect are certain high period crystals such as ruby, yttrium garnet, metallic tungstates or molybdates doped with rare earth ions; semiconductors such as gallium arsenide, neodymium-doped glass; various gasses, including carbon dioxide, helium, argon, neon, and plasmas, and the like.

Pallet is a platform on which the tire is placed; in one embodiment, the tire may be placed on a pallet outside of an inspection station and acts as a portable platform for movement of the tire into the inspection station; in another embodiment the tire and pallet may be placed in the inspection station and the pallet remains in the inspection station and the tire is moved onto the platform before the inspection and is removed from the pallet after the inspection.

Paw is a device capable of handling or gripping the bead of a tire.

In this form of Non-Destructive Testing (NDT), non-destructive means a testing technique where the object to be tested is subjected to a stressing element and at the end of the testing the object is reverted to substantially its original condition. The processor is a device or software, usually a central processing unit; it can also be a program that transforms some input into some output such as a computer or linkage editor; it facilitates the comparisons of images; it may be a hardwired device using embedded instructions to perform the comparisons.

Stressing element means an element that is used to apply stress or strain to an object to cause a change from its original condition. Such stressing can take the form of the application of a vacuum, the application of light, the application of a gas, the application of a mechanical force to permit flexing, the application of acoustical sound thereby vibrating the tire, or some other vibrating technique.

Figure 1:
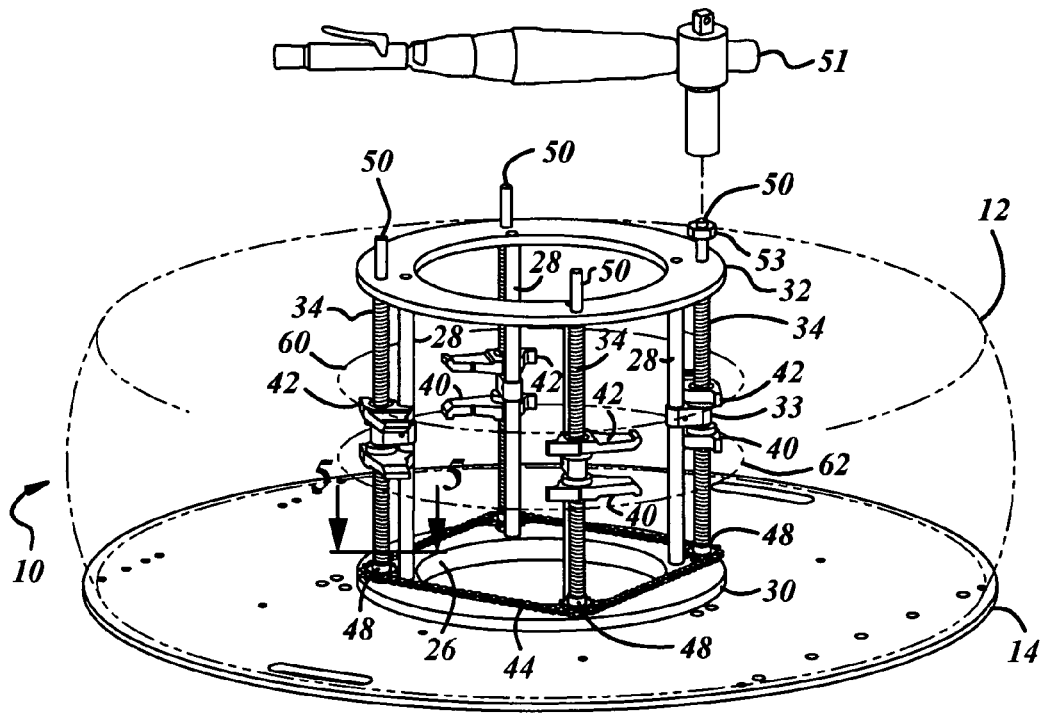
FIG. 1 is a perspective view of the adjustable tire spreader ready to accept the tire.

In general, the apparatus and method of the present invention can be described as follows:

FIG. 1 shows a perspective view of the adjustable tire viewer and inspection apparatus 10 of the present invention where the tire 12 is placed on the pallet 14. The inspection apparatus 16 is on a tower 18 and moves by an electric motor 20 (not shown) placed on the drive assembly 24.

Figure 2:
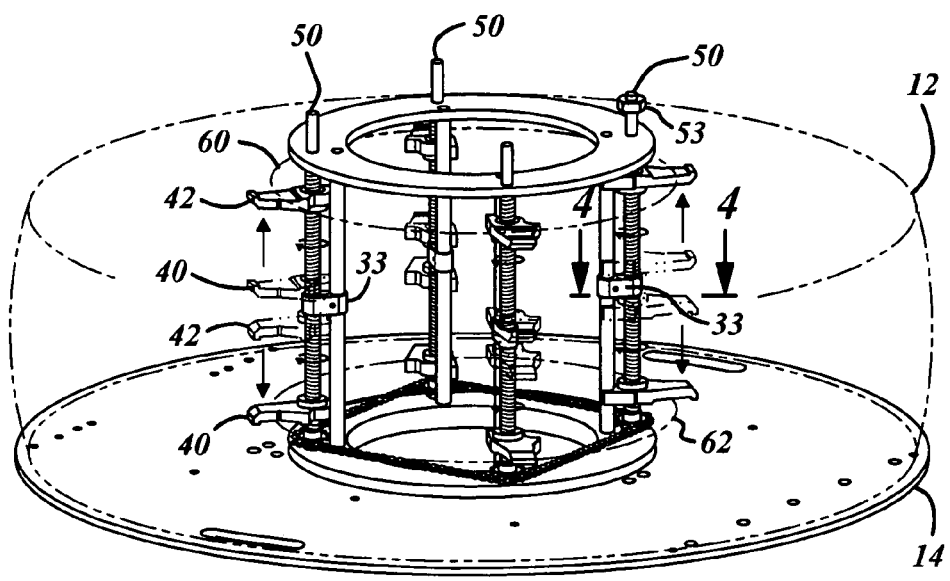
FIG. 2 is a perspective view of the adjustable tire spreader with the tire spread ready for inspection.

The inspection apparatus 16 moves vertically upward and downward on a line through the aperture 26 in the pallet 14 FIG. 2. Spaced about the pallet aperture is a plurality of vertical members 28. The vertical members may be secured to the pallet 14 directly or onto a ring 30which is attached to the pallet. The lower portion of the vertical members 28 are retained in position by securing them to the ring 30 while the upper portion of the vertical members is secured to an upper ring 32. The vertical members 28, the threaded members 34 to which are engaged lower paws 40 and upper paws 42 are held together by a brace link 33.

The threaded vertical members 34 can move simultaneously because chain 44, best shown in FIG. 5, is connected to a sprocket 46 at the end 48 of the threaded members. At the top 50 of the threaded members, one or several of them may have a hex nut 50 to engage a tool 51. As the tool rotates, it will rotate a threaded member and accordingly the remaining threaded members are rotated by virtue of the sprocket 46 whose teeth 47 engage the chain 44. Figure one shows the paws 40, 42 in a closed position. When the tire is placed on the pallet 14, the paws 40 and 42 are in the closed position.

After the tire is on the pallet the threaded member 34 rotates, the paws 42 move from the closed position 42 A to the open position as shown in FIGS. 2, 3 and 4 As shown in FIG. 4, the paws rotate to the right from the closed position 42 A when the first stop 43 comes in contact with vertical member 28. The paw then moves to the open position as shown in FIGS. 3 and 4 at the second stop 45 of the.

The beads 60 and 62 of the tire 12 are gripped by paws 40 and 42 as the paws move up and down on the threaded members 34, as best shown in FIG. 2 and the beads are separated.

The inspection apparatus 16 moves on the lift tube 18 from a position below the pallet 14, to an inspection position, as shown in FIG. 3. The lift tube 18 is mounted on support member 19. Thereafter, the inspection takes place. After the inspection is completed, the inspection apparatus moves to a position below the pallet. The tire spreader and pallet move out of the inspection station. Then the tire is removed from the pallet and spreader assembly. In this embodiment, there is the utilization of a pallet assembly station. In the pallet assembly station, the tire is placed on the pallet and the paws are aligned with the beads of the tire.

Alternatively, the pallet and the spreader assembly, that which is shown in figure number 1, with the exception of the tire and tool, can be in place in an inspection station that has the inspection apparatus 16, including the lasers 70 and cameras 74. In this fashion, the tire is readily inserted onto the pallet 14 and is separated by the paws 40 and 42 as described above.

The inspection apparatus 16 can generally be described as having a plurality of lasers 70 and a plurality of light receiving apparatus 74, such as a camera. For a more detailed description, see applicants' copending U.S. patent application Ser. No. 11/066,672 for NON-DESTRUCTIVE TESTING AND IMAGING Filed: Feb. 25, 2005 and U.S. patent application Ser. No. 11/067,256 for A PLURALITY OF LIGHT SOURCES FOR INSPECTION APPARATUS AND METHOD Filed: Feb. 25, 2005 now U.S. Pat. No. 7,187,437, both herein incorporated by reference. Basically, when the beads of the tire are separated by paws 40 and 42, the tire, spreader and pallet move from outside the inspection station to inside the inspection station and then the inspection apparatus goes into operation. The laser light is reflected off the interior surface of the tire as the tire it is being stressed and the light is reflected from the tire and is captured in the camera. As is explained in applicant's U.S. patent applications identified above and U.S. Pat. No. 6,934,018, the information so captured can be analyzed by a computer to determine an anomaly in a tire.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or the scope of the invention. For example the type of laser to be utilized can vary substantially; the software in the computer that is described herein can be varied depending upon the changes in technology with respect to the computer or computer devices and updates to the types of software. In addition, the mechanism for holding the threaded members to a platform can be varied to suit the variations in tires, by virtue of using different linkage mechanisms for moving the paws from the closed to the open position.

The invention claimed is:

1. An adjustable tire spreader and inspection apparatus comprising a pallet for supporting a tire to be viewed for inspection, the pallet having an aperture aligned with the hole of the tire;

an optical inspection apparatus, adapted to inspect the tire at an inspection position when the tire is on the pallet; and a plurality of a pair of paws, the paws vertically aligned and adapted to separate the beads of the tire to allow the optical inspection apparatus to inspect the entire tire; each pair of paws positioned about the aperture of the pallet and capable of rotating from a closed to an open position of the tire beads; each pair of paws spaced about the beads of the tire and adapted to simultaneously move to spread the tire beads for inspection of the entire tire.

2. The apparatus of claim 1 wherein each pair of paws is located on a threaded shaft and each shaft is adapted to rotate and move the paws from the closed position, which is when the tire is placed on the pallet to the open position, which is when the inspection apparatus inspects the tire after the beads of the tire are separated.

3. The apparatus of claim 2 wherein a sprocket is located at the end of each shaft, and a chain is connected to all of the sprockets thereby facilitating all of the shafts to rotate simultaneously.

4. The apparatus of claim 2 wherein a tool receiving end is located on the top of one shaft and is adapted to be rotated by a tool which rotation movement, in turn, rotates all of the shafts simultaneously.

5. The apparatus of claim 1 wherein the optical inspection apparatus is located in an inspection station and is comprised of a laser which reflects light off the interior of the tire and a camera which captures the reflected light.

6. The apparatus of claim 1 further comprising a pallet assembly station whereby the tire is placed on the pallet and the paws are aligned with the bead of the tire; and a tire inspection station, spaced apart from the assembly section; the optical inspection apparatus adapted to move from to and from the plane of the palette.

7. A method of inspecting a tire comprising
providing the apparatus of claim 1;
placing the tire on the pallet;
aligning the paws with the bead of the tire;
simultaneously moving the paws to separate the beads of the tire;
aligning the inspection apparatus with the tire; and
inspecting the tire.

8. The method of claim 6 further comprising
simultaneously moving the paws to the closed position;
moving the inspection apparatus from the plane of the pallet; and
removing the tire from the pallet.

9. A method of inspecting a tire comprising
providing the apparatus of claim 5;
placing the tire on the pallet;
simultaneously moving the paws to separate the beads of the tire;
moving the tire and pallet assembly from a position spaced from the inspection station to a position in the inspection station;
moving the inspection apparatus from a position spaced from the plane of the platform to the plane of the pallet; and
inspecting the tire.

10. The method of claim 8 further comprising
simultaneously moving the paws to the closed position;
moving the inspection apparatus from the plane of the pallet; and
removing the tire from the pallet.

11. The method of claim 6 wherein the tire is in a stationary position on the pallet during the inspecting of tire.

* * * * *